(12) United States Patent
Ljungblad et al.

(10) Patent No.: US 9,676,031 B2
(45) Date of Patent: Jun. 13, 2017

(54) METHOD AND APPARATUS FOR FORMING A THREE-DIMENSIONAL ARTICLE

(71) Applicant: Arcam AB, Moelndal (SE)

(72) Inventors: Ulric Ljungblad, Moelndal (SE); Lars Loewgren, Haellingsjoe (SE); Anders Snis, Uddelvalla (SE); Mattias Fager, Goeteborg (SE)

(73) Assignee: Arcam AB, Moelndal (SE)

( * ) Notice: Subject to any disclaimer, the term of this patent is extended or adjusted under 35 U.S.C. 154(b) by 245 days.

(21) Appl. No.: 14/230,957

(22) Filed: Mar. 31, 2014

(65) Prior Publication Data
US 2014/0314609 A1    Oct. 23, 2014

Related U.S. Application Data

(60) Provisional application No. 61/815,028, filed on Apr. 23, 2013.

(51) Int. Cl.
*B22F 3/105* (2006.01)
*B29C 67/00* (2017.01)
(Continued)

(52) U.S. Cl.
CPC ............. *B22F 3/1055* (2013.01); *B22F 3/12* (2013.01); *B23K 15/00* (2013.01);
(Continued)

(58) Field of Classification Search
CPC ............................ B22F 3/1055; B23K 15/00
See application file for complete search history.

(56) References Cited

U.S. PATENT DOCUMENTS 2,264,968 A    12/1941  De Forest
2,323,715 A     7/1943  Kuehni
(Continued)

FOREIGN PATENT DOCUMENTS

CA    2860188 A1    6/2006
CN    101607311 A   12/2009
(Continued)

OTHER PUBLICATIONS

United States Patent and Trademark Office, Office Action for U.S. Appl. No. 12/810,602, Sep. 11, 2014, 7 pages, USA.
(Continued)

*Primary Examiner* — Jessee Roe
*Assistant Examiner* — Christopher Kessler
(74) *Attorney, Agent, or Firm* — Alston & Bird LLP

(57) ABSTRACT

An apparatus for forming at least one three-dimensional article by fusing parts of a powder bed layer-wise. The apparatus comprising a powder distributor and an energy beam for fusing the powder layer. Said powder distributor comprises a first part being an elongated rod provided movable at a predetermined distance above the powder bed and with its central axis in parallel with a top surface of said work table and second part being a metal foil having at least a first and a second opposite edge portions. Said metal foil is provided between said elongated rod and said work table, said first and second opposite edge portions are attached to said elongated rod so that a distance between said first and second edge portions is smaller than the distance between said first and second edge portions of said metal foil when said metal foil is in a flat position.

19 Claims, 8 Drawing Sheets

(51) Int. Cl.
  *B23K 15/00* (2006.01)
  *B22F 3/12* (2006.01)
(52) U.S. Cl.
  CPC .. *B29C 67/0077* (2013.01); *B22F 2003/1056* (2013.01); *Y02P 10/295* (2015.11)

(56) References Cited

U.S. PATENT DOCUMENTS

| | | |
|---|---|---|
| 3,882,477 A | 5/1975 | Mueller |
| 4,348,576 A | 9/1982 | Anderl et al. |
| 4,352,565 A | 10/1982 | Rowe et al. |
| 4,401,719 A | 8/1983 | Kobayashi et al. |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,511,103 A | 4/1996 | Hasegawa |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,419,203 B1 | 7/2002 | Dang |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,537,722 B2 | 5/2009 | Andersson et al. |
| 7,540,738 B2 | 6/2009 | Larsson et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,310,188 B2 | 4/2016 | Snis |
| 9,505,172 B2 | 11/2016 | Ljungblad |
| 9,550,207 B2 | 1/2017 | Ackelid |
| 2002/0104973 A1 | 8/2002 | Kerekes |
| 2002/0152002 A1* | 10/2002 | Lindemann .......... B22F 3/1055 700/119 |
| 2002/0195747 A1 | 12/2002 | Hull et al. |
| 2003/0133822 A1 | 7/2003 | Harryson |
| 2003/0205851 A1 | 11/2003 | Laschutza et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0217095 A1 | 11/2004 | Herzog |
| 2005/0173380 A1 | 8/2005 | Carbone |
| 2005/0186538 A1 | 8/2005 | Uckelmann |
| 2006/0108712 A1 | 5/2006 | Mattes |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0175875 A1 | 8/2007 | Uckelmann et al. |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2010/0260410 A1 | 10/2010 | Taminger et al. |
| 2010/0310404 A1 | 12/2010 | Ackelid |
| 2010/0316856 A1 | 12/2010 | Currie et al. |
| 2011/0133367 A1 | 6/2011 | Weidinger et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0223059 A1 | 9/2012 | Ljungblad |
| 2012/0225210 A1 | 9/2012 | Fruth |
| 2012/0266815 A1* | 10/2012 | Brunermer .......... B29C 67/0081 118/696 |
| 2013/0055568 A1 | 3/2013 | Dusel et al. |
| 2013/0186514 A1 | 7/2013 | Zhuang et al. |
| 2013/0216959 A1 | 8/2013 | Tanaka et al. |
| 2013/0264750 A1 | 10/2013 | Hofacker et al. |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |

(56) References Cited

U.S. PATENT DOCUMENTS

| | | |
|---|---|---|
| 2016/0211116 A1 | 7/2016 | Lock |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |

FOREIGN PATENT DOCUMENTS

| | | |
|---|---|---|
| CN | 101635210 A | 1/2010 |
| CN | 201693176 U * | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| FR | 2980380 A1 | 3/2013 |
| JP | 2003241394 A | 8/2003 |
| JP | 2003245981 | 9/2003 |
| JP | 2009006509 A | 1/2009 |
| SE | 524467 C2 | 8/2004 |
| WO | WO 93/08928 A1 | 5/1993 |
| WO | WO 96/12607 A1 | 5/1996 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/142492 A1 | 9/2015 |

OTHER PUBLICATIONS

United States Patent and Trademark Office, Office Action for U.S. Appl. No. 14/350,767, Nov. 24, 2014, 16 pages, USA.

International Searching Authority, International Search Report for International Application No. PCT/EP2012/058733, Mar. 5, 2013, 4 pages, European Patent Office, The Netherlands.

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

European Search Report dated Feb. 16, 2012, for corresponding Application No. EP07852089.7.

Guibas, Leonidas J., et al., "Randomized Incremental Construction Of Delaunay And Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, mailed Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pages, European Patent Office, Germany.

International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.

International Preliminary Report on Patentability, dated Nov. 27, 2009, of corresponding international application No. PCT/SE2007/001084.

International Search Report dated Apr. 9, 2010 for Application No. PCT/SE2009/050901.

International Search Report dated Sep. 17, 2008 for Application No. PCT/SE2008/000007.

International Search Report mailed Sep. 2, 2008 of corresponding international application No. PCT/SE2007/001084.

International Searching Authority (ISA), International Search Report and Written Opinion for International Application No. PCT/EP2012/076025, mailed May 17, 2013, 11 pages, European Patent Office, The Netherlands.

International Searching Authority, International Search Report and Written Opinion for International Application No. PCT/EP2012/074383, mailed Feb. 27, 2013, 10 pages, European Patent Office, The Netherlands.

International Searching Authority, International Search Report for International Application No. PCT/SE2011/050093, mailed Oct. 20, 2011, 5 pages, The Swedish Patent and Registration Office, Sweden.

Office Action dated Feb. 14, 2012 for U.S. Appl. No. 12/745,081.

Office Action dated Nov. 8, 2011, U.S. Appl. No. 12/745,081.

United States Patent and Trademark Office, Final Office Action for U.S. Appl. No. 12/745,081, dated Jun. 21, 2012, 6 pages, USA.

United States Patent and Trademark Office, Notice Of Allowance and Fee(s) Due for U.S. Appl. No. 13/144,451, mailed Sep. 25, 2012, 16 pages, USA.

(56) References Cited

OTHER PUBLICATIONS

United States Patent and Trademark Office, Office Action for U.S. Appl. No. 12/810,602, mailed Sep. 10, 2012, 13 pages, USA.
United States Patent and Trademark Office, Office Action for U.S. Appl. No. 12/810,602, Dec. 20, 2012, 8 pages, USA.
Weigel, TH., et al., "Design And Preparation Of Polymeric Scaffolds For Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.

\* cited by examiner

METHOD AND APPARATUS FOR FORMING A THREE-DIMENSIONAL ARTICLE

CROSS-REFERENCE TO RELATED APPLICATIONS

This application claims priority to and the benefit of U.S. Provisional Patent Application Ser. No. 61/815,028, filed Apr. 23, 2013, the contents of which are hereby incorporated by reference in their entirety.

BACKGROUND

Technical Field

The present invention relates to an apparatus for forming at least one three-dimensional article by fusing powder layer by layer.

Description of Related Art

Freeform fabrication or additive manufacturing is a method for forming three-dimensional articles through successive fusion of chosen parts of powder layers applied to a worktable.

Such an apparatus may comprise a work table on which the three-dimensional article is to be formed, a powder dispenser, arranged to lay down a thin layer of powder on the work table for the formation of a powder bed, an energy beam for delivering energy to the powder whereby fusion of the powder takes place, elements for control of the energy given off by the energy beam over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

The powder distribution process has proven to be a major contributor to the final quality of the three dimensional article. A bad powder distribution process may introduce non sharp edges and non-homogenous material properties of the final three-dimensional article.

In view of the above and other considerations, there is thus a need in the art for an improved additive manufacturing apparatus having a powder distributor which is capable of distributing the powder more evenly and more compact in a repetitive manner compared to the state of the art.

BRIEF SUMMARY

An object of the invention is to provide an apparatus for forming three dimensional articles by fusing powder layer by layer which comprises a powder distributor which solves the above mentioned need in the art. The abovementioned object is achieved by the features of the apparatus claimed herein.

According to various embodiments, the present invention provides an apparatus for forming at least one three-dimensional article through successive fusion of parts of a powder bed, which parts corresponds to successive cross sections of the three-dimensional article. The apparatus comprising a powder distributor for evenly distributing a layer of powder on top of a work table, an energy beam for fusing the powder layer in selected locations corresponding to the cross section of the three-dimensional article, wherein the powder distributor comprises at least a first and a second part, the first part being an elongated rod provided movable at a predetermined distance above the powder bed and with its central axis in parallel with a top surface of the work table, the second part being a foil having at least a first and a second opposite edge portions, the foil is provided between the elongated rod and the work table, the first and second opposite edge portions are attached to the elongated rod so that a distance between the first and second edge portions is smaller than the distance between the first and second edge portions of the foil when the foil is in a flat position.

The second part of the powder distributor, the foil, may be flexible in a direction perpendicular to the surface of the powder to be fused. This flexibility of the second part may enhance the compacting of the powder and thereby improve the material properties of the three-dimensional article.

In certain exemplary embodiments the foil has a plurality of slits. The slits may increase the flexibility without sacrificing the reliability of the powder distributor. The same flexibility may become possible with a thinner foil, but with decreased life time as a result.

In still another embodiment the slits is pointing in a direction perpendicular to the first and second opposite edge portions or the slits are building an angle with the first and second opposite edge portions, which is between 25-65 degrees or the slits are curved or meander shaped. Different shapes, openings and/or length of the slits may alter the flexibility of the foil.

In still another example embodiment the powder provided on the work table may be made of metal, plastic, ceramic or composite material.

In yet another example embodiment the surface of the elongated rod which the foil is attached to may be flat, convex or concave. Different shapes of the surface may provide for different powder distribution characteristics which may be suitable for different powder materials.

In still another example embodiment the foil and the surface of the elongated rod which the foil is attached to may be at least partly separated from each other. The separation may be used for allowing the foil to flex in a direction perpendicular to the surface of the powder to be fused. The foil may be bent to form a semi-circle, i.e., the distance from the foil to the surface of the elongated rod which is pointing in a direction towards the work table may vary with the curvature of the foil, i.e., at the attachment points the distance may be zero or close to zero and in the middle of the attachment points the distance may be at its maximum.

In still another example embodiment the distance between the first and second opposite edge portions of the foil when attached to the elongated rod is smaller than a width of the flat or concave surface. In this embodiment the foil is attached to the surface of the elongated rod which is pointing in a direction towards the work table.

In yet another example embodiment the first and second opposite edge portions of the foil is provided in a first and second slit respectively provided in the flat or concave surface. In this embodiment the foil is securely fastened on the first part by means of the slits.

In still another example embodiment the foil is removable attached to the elongated rod. The foil may be fastened to the first part by means of a screw which is securing the foil in the slit or to another part of the first part.

In still another example embodiment the thickness of the foil is smaller than 1 mm. In another example embodiment the thickness is set to achieve a predetermined flexibility.

In still another example embodiment the foil is made of non-limiting materials such as metal, plastic, carbon fibre or Kevlar. In yet another example embodiment the foil is made of the same material as the powder material which is to be fused. This may be advantageous since the foil may lose some material to the powder, which, if in another material, may contaminate the fusion process and affect the material characteristics of the three-dimensional part.

In still another example embodiment at least one vibrator may be attached to the elongated rod. The vibrator may enhance the compacting of the powder material.

In still another example embodiment the rod comprises of at a first and second element attached together via the foil and a support member. Such an embodiment may improve the flexibility of the second member which is attached to the first and second element. The support member and the foil together may determine the flexibility of the powder distributor.

In still another example embodiment the at least one vibrator is attached between the first and second elements.

In another aspect of the present invention it is provided a three dimensional article manufactured by an apparatus for forming at least one three-dimensional article through successive fusion of parts of a powder bed, which parts corresponds to successive cross sections of the three-dimensional article. The apparatus comprises a powder distributor for evenly distributing a layer of powder on top of a work table, an energy beam for fusing the powder layer in selected locations corresponding to the cross section of the three-dimensional article, wherein the powder distributor comprises at least a first and a second part, the first part being an elongated rod provided movable at a predetermined distance above the powder bed and with its central axis in parallel with a top surface of the work table, the second part being a foil having at least a first and a second opposite edge portions, the foil is provided between the elongated rod and the work table, the first and second opposite edge portions are attached to the elongated rod so that a distance between the first and second edge portions is smaller than the distance between the first and second edge portions of the foil when the foil is in a flat position.

In another aspect of the present invention it is provided a method for forming at least one three-dimensional article through successive fusion of parts of a powder bed, which parts correspond to successive cross sections of the three-dimensional article. The method comprises the steps of: distributing evenly a layer of powder on top of a work table with a powder distributor; applying an energy beam for fusing the layer of powder in selected locations corresponding to the cross section of the three-dimensional article; and compacting the powder with the powder distributor by means of at least one second part of the powder distributor, the second part being resilient in relation to a first part of the powder distributor in a direction perpendicular to the surface of the powder layer.

BRIEF DESCRIPTION OF SEVERAL VIEWS OF THE DRAWINGS

Various embodiments of the invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

To facilitate the understanding of various embodiments of the present invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 2:
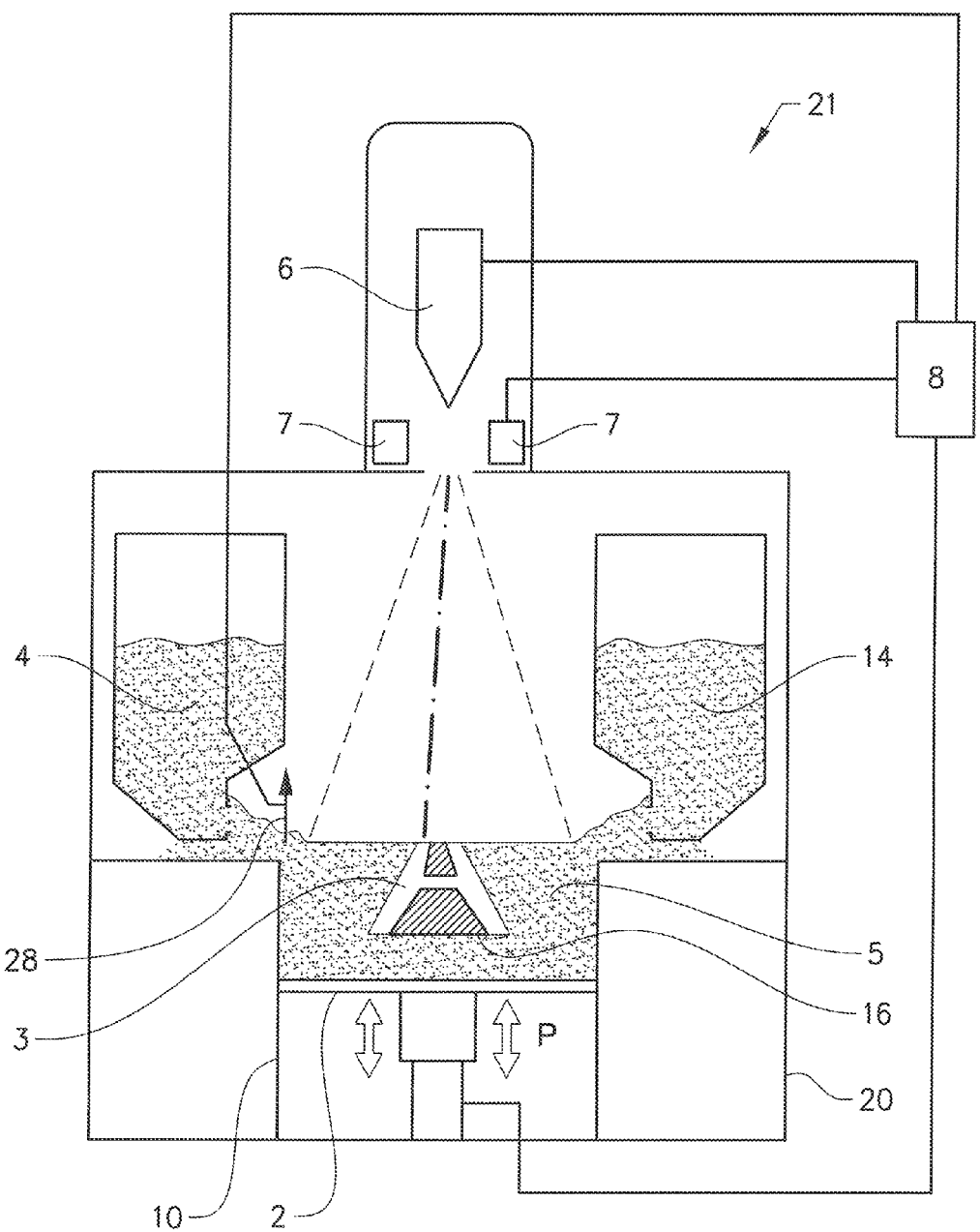
FIG. 2 depicts a schematic figure of an additive manufacturing apparatus.

FIG. 2 depicts an embodiment of a freeform fabrication or additive manufacturing apparatus 21 in which the inventive method according to the present invention may be implemented.

The apparatus 21 comprising an electron beam gun 6; deflection coils 7; two powder hoppers 4, 14; a build platform 2; a build tank 10; a powder distributor 28; a powder bed 5; and a vacuum chamber 20.

The vacuum chamber 20 is capable of maintaining a vacuum environment by means of a vacuum system, which system may comprise a turbo-molecular pump, a scroll pump, an ion pump and one or more valves which are well known to a skilled person in the art and therefore need no further explanation in this context. The vacuum system is controlled by a control unit 8.

The electron beam gun 6 is generating an electron beam which is used for melting or fusing together powder material provided on the build platform 2. At least a portion of the electron beam gun 6 may be provided in the vacuum chamber 20. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to the control unit 8. In an example embodiment of the invention the electron beam gun 6 generates a focusable electron beam with an accelerating voltage of about 15-60 kV and with a beam power in the range of 3-10 Kw. The pressure in the vacuum chamber may be $10^{-3}$ mbar or lower when building the three-dimensional article by fusing the powder layer by layer with the energy beam.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr alloys, nickel based superalloys etc.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws etc. The servo engine may be connected to the control unit 8.

An electron beam may be directed over the build platform 2 causing the first powder layer to fuse in selected locations to form a first cross section of the three-dimensional article 3. The beam is directed over the build platform 2 from instructions given by the control unit 8. In the control unit 8 instructions for how to control the electron beam for each layer of the three-dimensional article is stored. The first layer of the three dimensional article 3 may be built on the build platform 2, which may be removable, in the powder bed 5 or on an optional start plate 16. The start plate 16 may be arranged directly on the build platform 2 or on top of a powder bed 5 which is provided on the build platform 2.

After a first layer is finished, i.e., the fusion of powder material for making a first layer of the three-dimensional article, a second powder layer is provided on the build platform 2. The second powder layer is preferably distributed according to the same manner as the previous layer. However, there might be other methods in the same additive manufacturing machine for distributing powder onto the work table. For instance, a first layer may be provided by means of a first powder distributor 28, a second layer may be provided by another powder distributor. The design of the powder distributor is automatically changed according to instructions from the control unit 8. A powder distributor 28 in the form of a single rake system, i.e., where one rake is catching powder fallen down from both a left powder hopper 4 and a right powder hopper 14, the rake as such can change design.

After having distributed the second powder layer on the build platform, the energy beam is directed over the work table causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

In the case where an electron beam is used, it is necessary to consider the charge distribution that is created in the powder as the electrons hit the powder bed 5. The invention is, at least partly, based on the realization that the charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution.

By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during the pre-heating process. When the conductivity has become sufficiently high, the powder can be fused together, i.e. melted or fully sintered, with predetermined values of the beam current and beam scanning velocity.

Figure 3:
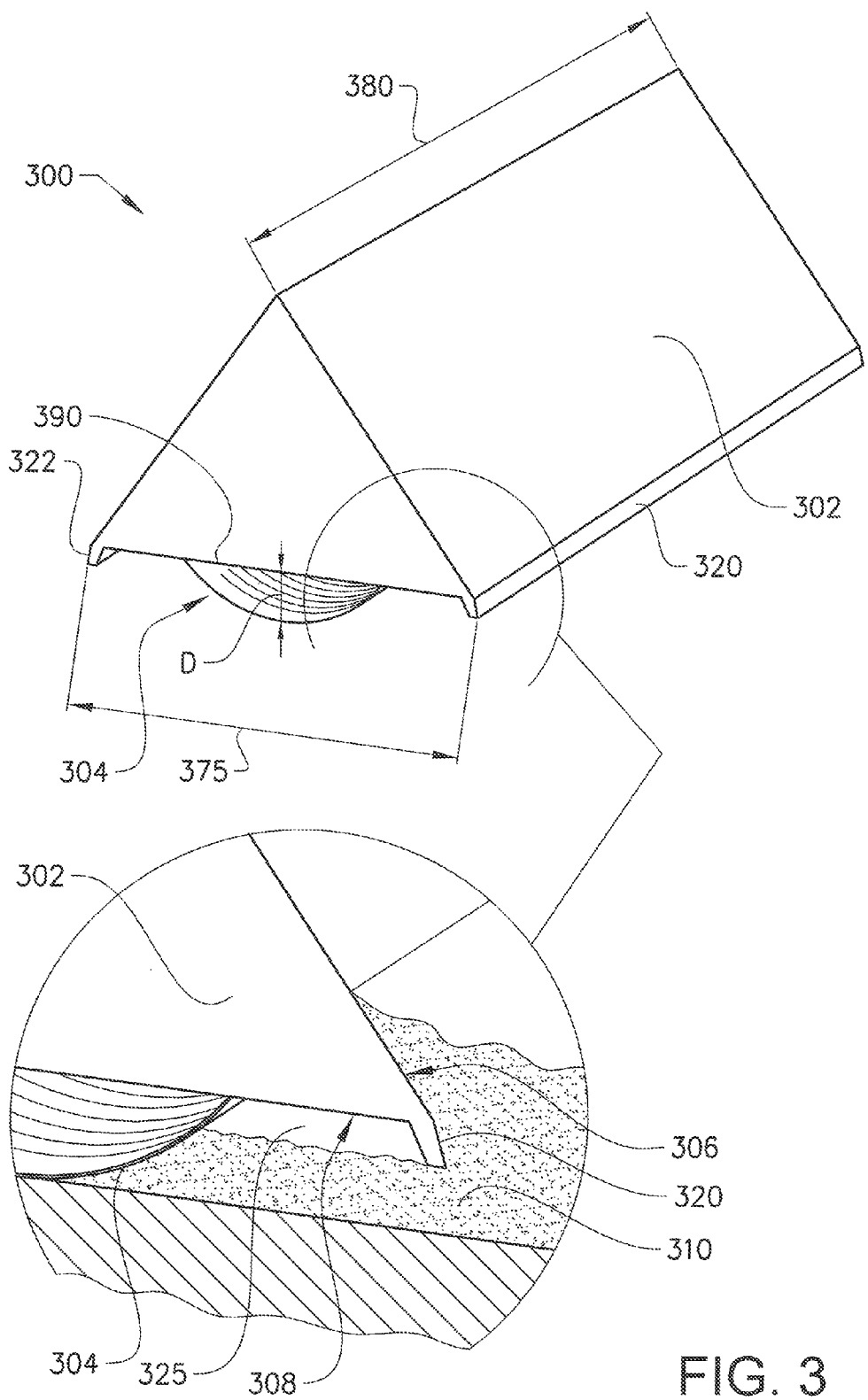
FIG. 3 depicts a perspective view of a first example embodiment of a powder distributor comprising a second part attached to a first part and an enlarged portion of the first and second part.
Figure 4:
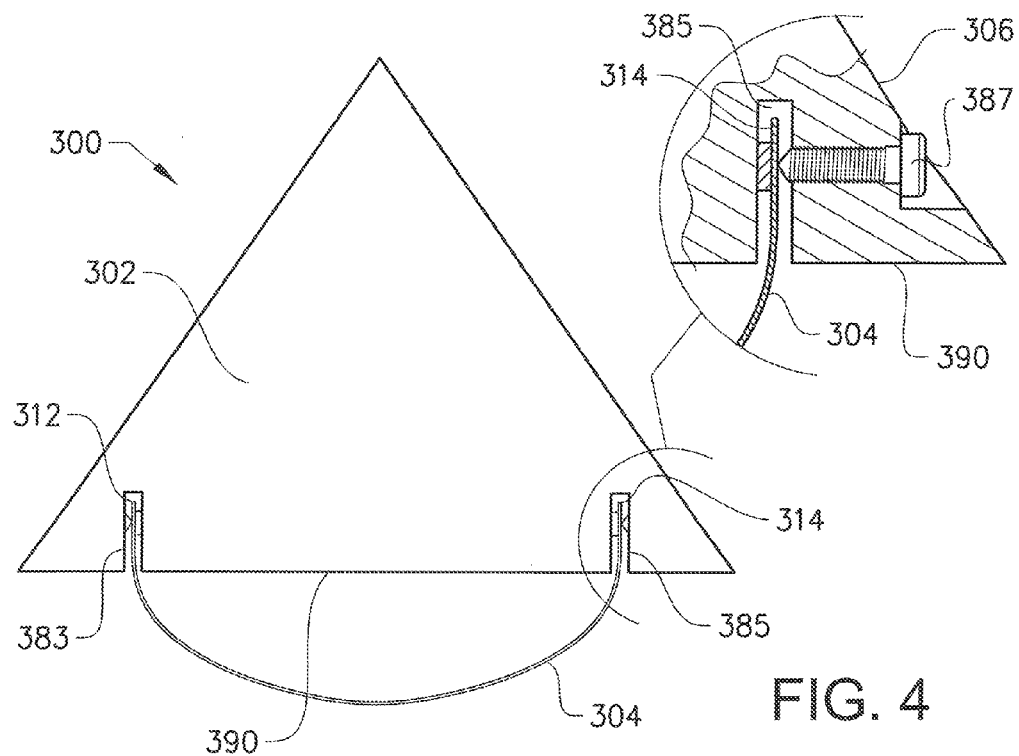
FIG. 4 depicts a front view of a second example embodiment of a powder distributor comprising a second part attached to a first part and an enlarged portion of the first and second part.

FIG. 3 depicts a schematic perspective view of first example embodiment of a powder distributor 300 comprising of a second part 304 attached to a first part 302 and an enlarged portion of the first part 302 and the second part 304.

The first part 302 may be an elongated rod provided movable at a predetermined distance above the powder bed and with its central axis in parallel with a top surface of the build platform 2. The length of the rod may be longer than the width of the build platform 2 in order to make it possible to distribute powder on each position of the build platform 2. The cross section of the elongated rod is in FIG. 3 illustrated to be triangular. The cross section may have any shape including but not limited to circular, elliptical, quadratic, rectangular, polygonal etc. The height of the powder distributor 300 may be set in order to give the powder distributor 300 a predetermined mechanical strength in a vertical direction, i.e., with a predetermined and controllable flex in the vertical direction. The height may also be chosen taking into account that the powder distributor 300 has to push forward a predetermined amount of powder. A too small height means that the powder distributor can push forward a smaller amount compared to a higher powder distributor 300. However, a too high powder distributor 300 may complicate the powder catching from a scree of powder, i.e., the higher the height of the powder distributor the more force may be required in order to catch a predetermined amount of powder from the scree of powder by moving the powder distributor into the scree of powder and letting a predetermined amount of powder fall over the top of the powder distributor from a first side in the direction of travel into the scree of powder to a second side in the direction of the powder table. There are other means for catching a predetermined amount of powder than the above mentioned method of moving the rake into a scree of powder, for instance a powder tank with a movable floor may be used and arranged beside the build platform. By adjusting the height of the floor a predetermined amount of powder may be raked off and provided on the build platform.

In the first embodiment as disclosed in FIG. 3, the first part 302 comprises an optional first protrusion 320 and an optional second protrusion 322.

The optional protrusion 320, 322 is provided on the first part 302 on order to create a volume 325 with no powder under the first part 302. This volume 325 may be set to take care of the powder which may be pushed in front of the second part 304. At least some powder may be compacted by the second part 304. The second part is flexible in a direction perpendicular to the powder surface and may provide for a predetermined force acting on the powder surface allowing for the compacting of the powder. Some of the powder may be pushed in front of the second part 304. Creating the volume 325 may decrease the force from the powder acting on the first part 302 in a direction perpendicular to the powder surface. The protrusion is in this embodiment provided at the foremost position of the first part and extending from the first part 302 essentially in a direction towards the powder bed 5. The length, its direction and position of the protrusion determines the volume 325.

The second part 304 may be a metal foil or a metal sheet having at least a first 312 and a second 314 opposite edge portions.

Figure 1A:
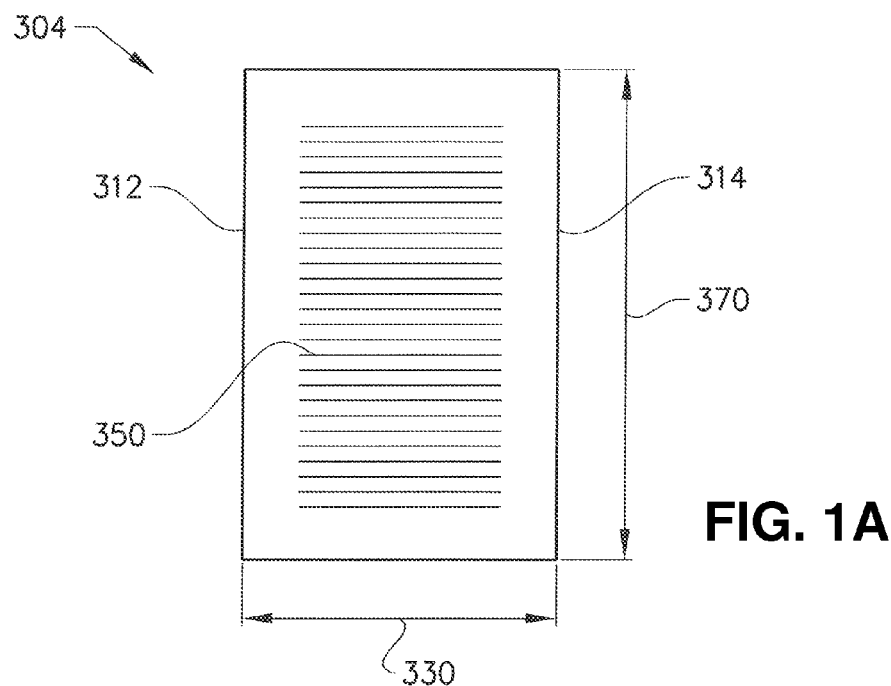
FIGS. 1A and 1B depict a top view of a first and second example embodiment of a second part of a powder distributor.
Figure 1B:
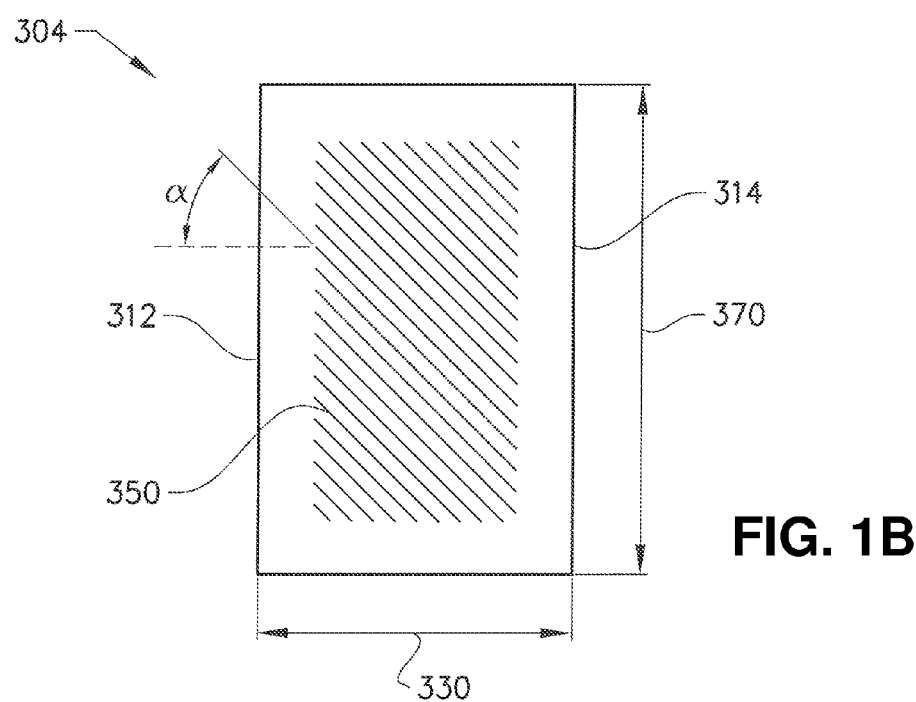

FIG. 1A depicts a first embodiment of the second part 304. The second part 304 is in this embodiment a rectangular metal sheet. The metal sheet or metal foil has first and second opposite edge portions 312, 314 respectively. The distance between the first and second opposite edge portions 312, 314 is denoted by 330 when the metal sheet or metal foil is in a flat position. The metal foil 304 may have a plurality of slits 350. In FIG. 1A the slits are provided perpendicular to the first and second opposite edge portions 312, 314. In FIG. 1B the slits 350 are provided slanted with respect to the first and second opposite edge portions 312, 314 respectively. An angle α of the slanted slits 350 with respect to the first 312 edge portion may vary between $0°≤α≤180°$ where $α≠90°$. The slits may decrease the spring force of the second part 304 when attached to the first part 302. Increasing the number of slits may decrease the spring force of the second part 304 when attached to the first part 302. The size of the slits and the direction of the slits may also influence the spring force and the quality of the top surface of the powder layer behind, i.e., already distributed, the powder distributor 300. The first part 302 and second part 304 may be separated by a predetermined distance, i.e., the second part 304 may be curved.

In the apparatus according to certain claims, wherein the slits 350 is pointing in a direction perpendicular to the first and second opposite edge portions 312, 314.

In an example embodiment the slits 350 is building an angle with the first edge portions 312, which is between 25-65 degrees.

In another example embodiment a thickness of the metal foil 304 is smaller than 1 mm.

The length 370 of the second part 304 may be equal to the length 380 of the first part 302. A bottom surface 390 of the first part 302 which the second part 304 may be attached to may be flat or concave. The bottom surface 390 may be pointing in a direction towards the powder bed. In an example embodiment the bottom surface 390 and the build platform 2 may have its surfaces in parallel with each other.

Figure 7A:
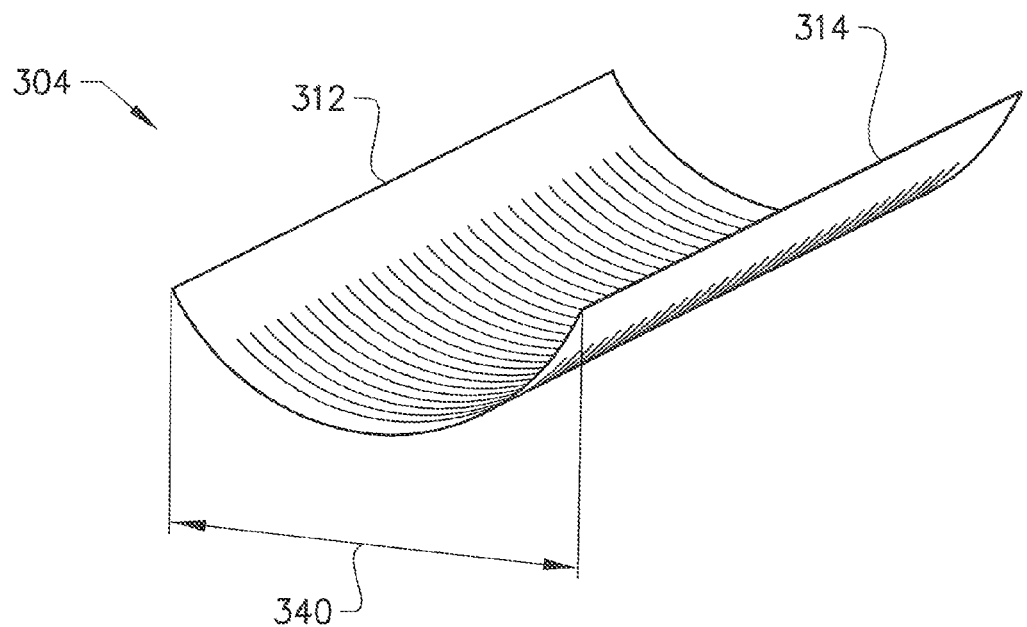
FIGS. 7A and 7B depict a perspective view of the first and second example embodiment of a foil in bent position.

FIG. 7A depicts a first example embodiment of a second part 304 in a slightly bent position. The distance 340 between the first 312 and second 314 opposite edge portions of the second part 304 when attached to the first part 302 may be smaller than a width 375 of the flat or concave surface 390.

Figure 7B:
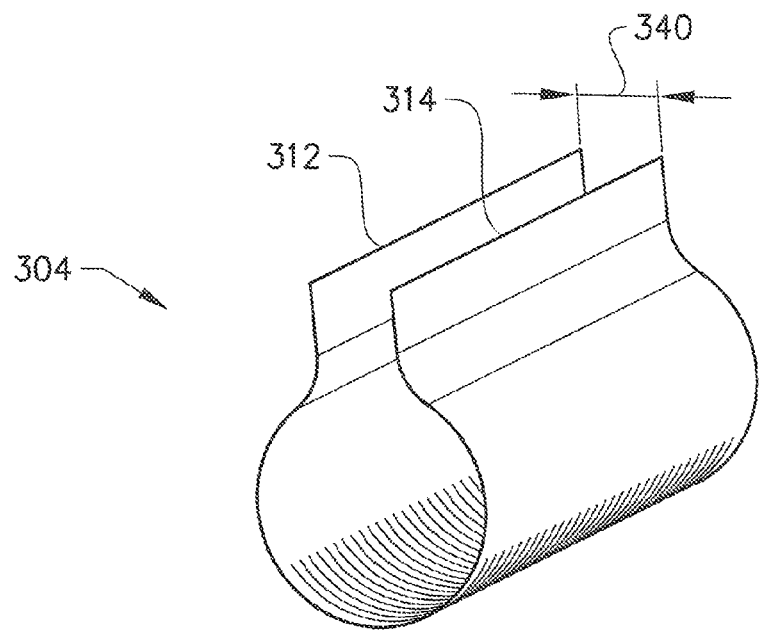

FIG. 7B depicts a second example embodiment of a second part 304 in a slightly bent position. The distance 340 between the first 312 and second 314 opposite edge portions of the second part 304 is smaller compared to the distance 340 in FIG. 7A.

FIGS. 7C-F depict a side view of a third, fourth, fifth and sixth example embodiment of a foil (second part) in bent position.

Figure 7C:
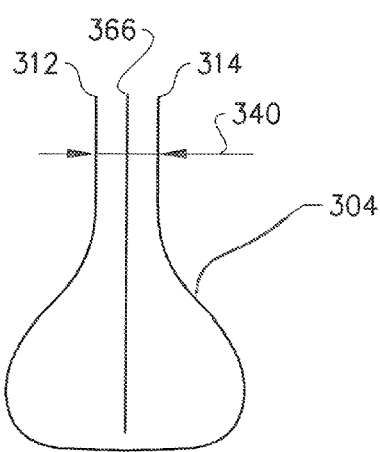
FIGS. 7C-7F depict a side view of a third, fourth, fifth and sixth example embodiment of a foil in bent position.

The third example embodiment in FIG. 7C comprises a bent second part 304 and a flexible plate 366 inside the second part 304. The second part 304 has a first 312 and second 314 edge portions, which may be attached to the first part 302. The plate may also be attached to the first part 302 at a position in the first part, which is located in between attachment positions of the first and second edge portions of the second part. The distance between the first 312 and second 314 edge portions are denoted by 340, which is a much smaller distance compared to if the second part would have been in a flat position.

The fourth example embodiment comprises a first second part 304 and a second part 304'. The second part 304' is arranged inside the first second part 304. The distance between a first 312 and a second 314 edge portion of the first second part 304 is denoted by 340. The distance between a first 312' and a second 314' edge portion of the second part 304' is denoted by 340'. The distance 340' is smaller than the distance 340. By providing a second part 304' inside the first second part 304 may increase the stability and decrease the flexibility of the compared to if not providing any means inside the first second part 304.

Figure 7D:
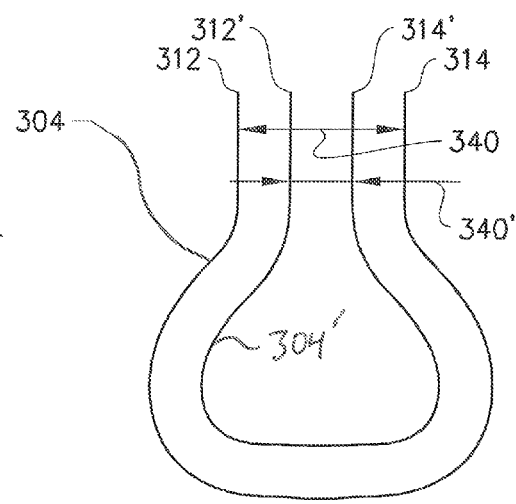
Figure 7E:
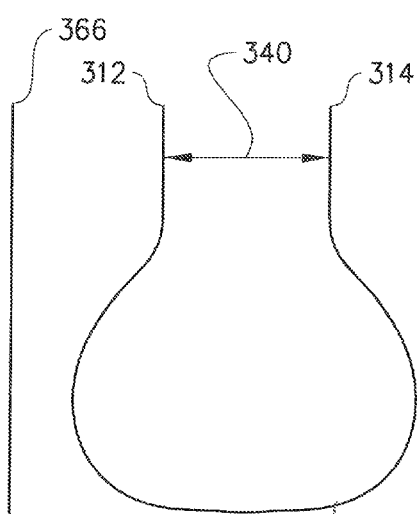

In FIG. 7E the plate 366 is provided outside the second part 304. The distance between a first edge portion 312 and a second edge portion 314 is denoted by 340. The plate 366 which is arranged outside the second part in FIG. 7E may provide for a more homogenous powder application. The plate may be arranged in front of the second part in the direction of movement of the first and second part. By providing the plate in front of the second part 304, the plate may scrape off surplus amount of powder while the second part 304 may compress the powder behind the plate 366. An edge portion of the plate 366 which is closest to the powder may be further away from the start plate than a bottom part of the second part 304, i.e., the part of the second part 304 which is closest to the start plate.

Figure 7F:
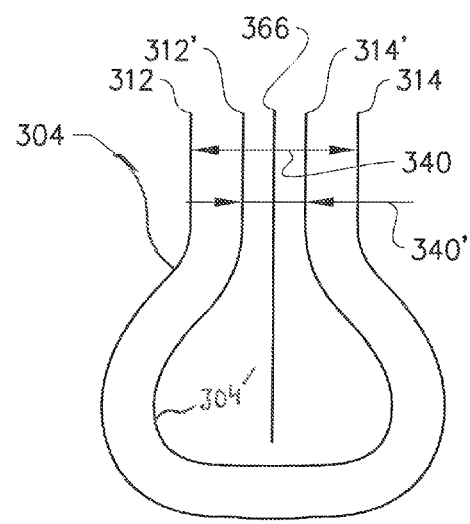

FIG. 7F is a combination of the example embodiments which are depicted in FIG. 7C and FIG. 7D. The example embodiment in FIG. 7F comprises a first second part 304, a second part 304' and a plate 366. The second part 304' is arranged inside the first second part 304. The plate 366 is arranged inside the second part 304'. The example embodiment in FIG. 7F may have a further increased stability and further decreased flexibility compared to the embodiments as depicted in FIGS. 7C and 7D. The material of the second part may be metal or plastic material. The second part may be of the same or different material as the powder to be distributed and fused. The first second part 304 may be made of metal while the second part 304' may be made of plastic. The first second part 304 may be made of plastic while the second part 304' may be made of metal. In other embodiments, the first second part 304 and the second part 304' are made of the same material. The plate 366 may be made of plastic material or metal material. Instead of just one plate 366 arranged on one side of the second part 304 as depicted in FIG. 7E a second plate may be arranged on the other side of the second part 304.

The first and second opposite edge portions 302, 304 of the foil 304 may be provided in a first and second slit 383, 385 respectively provided in the flat or concave surface 390. The foil 304 may be fixed in the slit 383, 385 by means of a screw 387. The foil 304 may be removable attached to the first part 302.

The second part 304 may be made of the same material as the powder material 5 which is to be fused for forming the three dimensional article 3. If the powder material is metal then the second part may be made of the same metal. If the powder material is plastic then the second part may be made of plastic.

Figure 6:
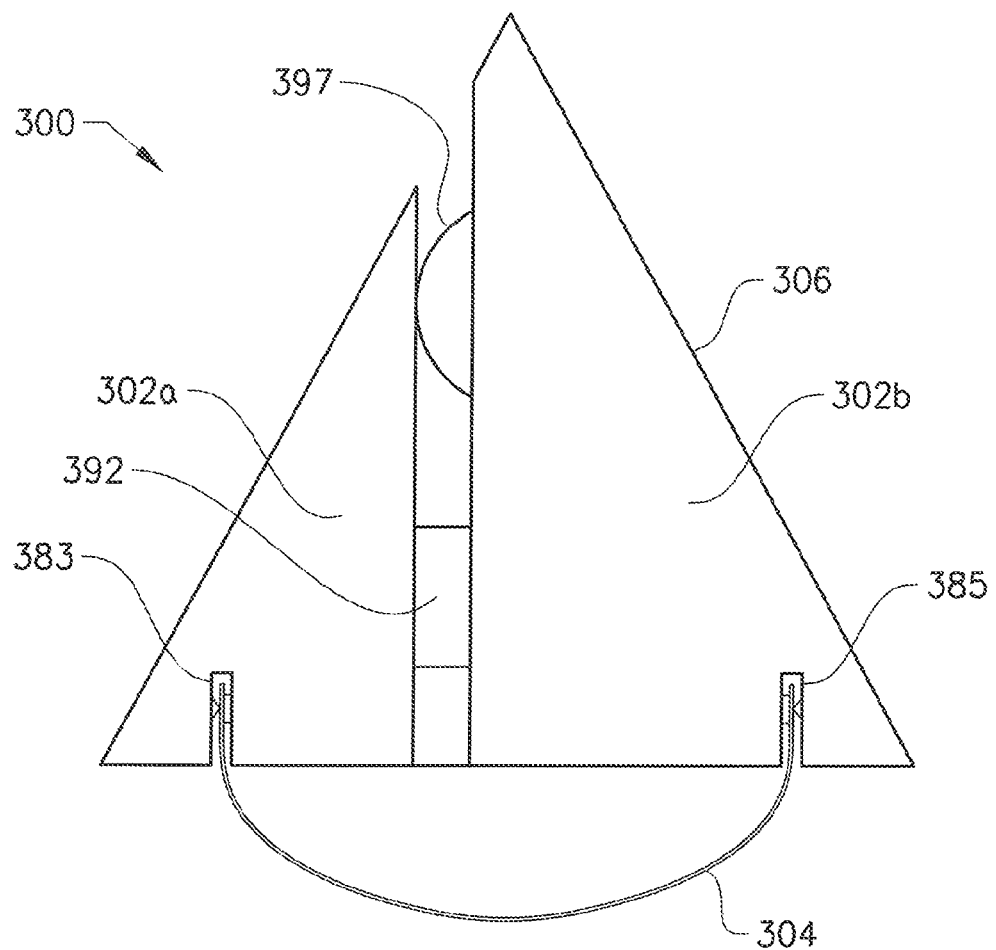
FIG. 6 depicts a perspective view of a fourth example embodiment of a powder distributor comprising a second part attached to a two-piece first part.

One or several vibrator(s) 392 may be attached to the first part, see FIG. 6. The vibrator 392 may be useful for compacting the powder material 5 which is used for forming the three dimensional article 2.

Figure 5:
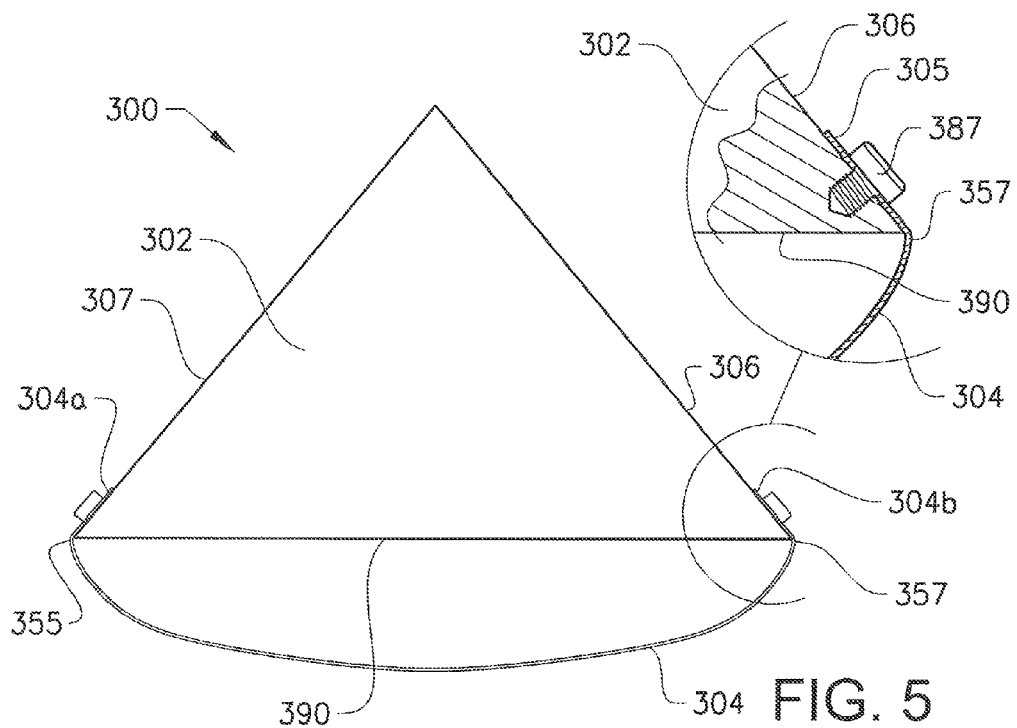
FIG. 5 depicts a front view of a third example embodiment of a powder distributor comprising a second part attached to a first part and an enlarged portion of the first and second part.

In FIG. 5 it is depicted yet another example embodiment of a powder distributor 300. In this embodiment the first part is an elongated rod having a cross section which is triangular shaped. A bottom surface 390 of the triangular may be pointing in a direction towards the powder bed. The triangular may have a first side 307 and a second side 306. The second part 304 may be attached to the first part 302 by bending the second part 304 around a first corner 355 created by the intersection of the first side 307 and the bottom surface 390 and by bending the second part around a second corner 357 created by the intersection of the second side 306 and the bottom surface 390. A first portion 304a of the second part 304 may be attached to the first side 307 by means of a screw 387. A second portion 304b of the second part 304 may be attached to the second side 306 by means of a screw 387.

The first part may comprise of at a first and second element 302a, 302b respectively attached together via the metal foil 304 and a support member 397. The support member 397 may be a spring element or any other flexible element. The support element may be attached to the first and second elements 302a and 302b respectively. The vibrator may in an example embodiment be provided between the first element 302a and the second element 302b. In an additional embodiment the vibrator is only attached to one of the first or second elements 302a, 302b respectively.

The metal foil 304 may be provided between the elongated rod and the build platform 2, the first and second opposite edge portions 312, 314 are attached to the elongated rod 302 so that a distance between the first and second edge portions 312, 314 is smaller than the distance between the first and second edge portions 312, 314 of the metal foil 304 when the metal foil 304 is in a flat position.

In an example embodiment of an apparatus for forming at least one three-dimensional article through successive fusion of parts of a powder bed, which parts corresponds to successive cross sections of the three-dimensional article according to the present invention, the apparatus comprising: a powder distributor for evenly distributing a layer of powder on top of a work table, an energy beam for fusing the powder layer in selected locations corresponding to the cross section of the three-dimensional article, wherein the powder distributor comprises at least a first and a second part, the first part being an elongated rod provided movable at a predetermined distance above the powder bed and with its central axis in parallel with a top surface of the work table, the second part being a metal foil having at least a first and a second opposite edge portions, the metal foil is provided between the elongated rod and the work table, the first and second opposite edge portions are attached to the elongated rod so that a distance between the first and second edge portions is smaller than the distance between the first and second edge portions of the metal foil when the metal foil is in a flat position.

The distance between the powder bed, i.e., the previous layer, and the bottom part of the powder distributor, i.e., bottom part of 304, may determine the thickness of the layer to be distributed. Depending on the flexibility of the second part 304, a compensation its deformation may have to be taken into account when estimating the powder layer thickness.

Figure 8:
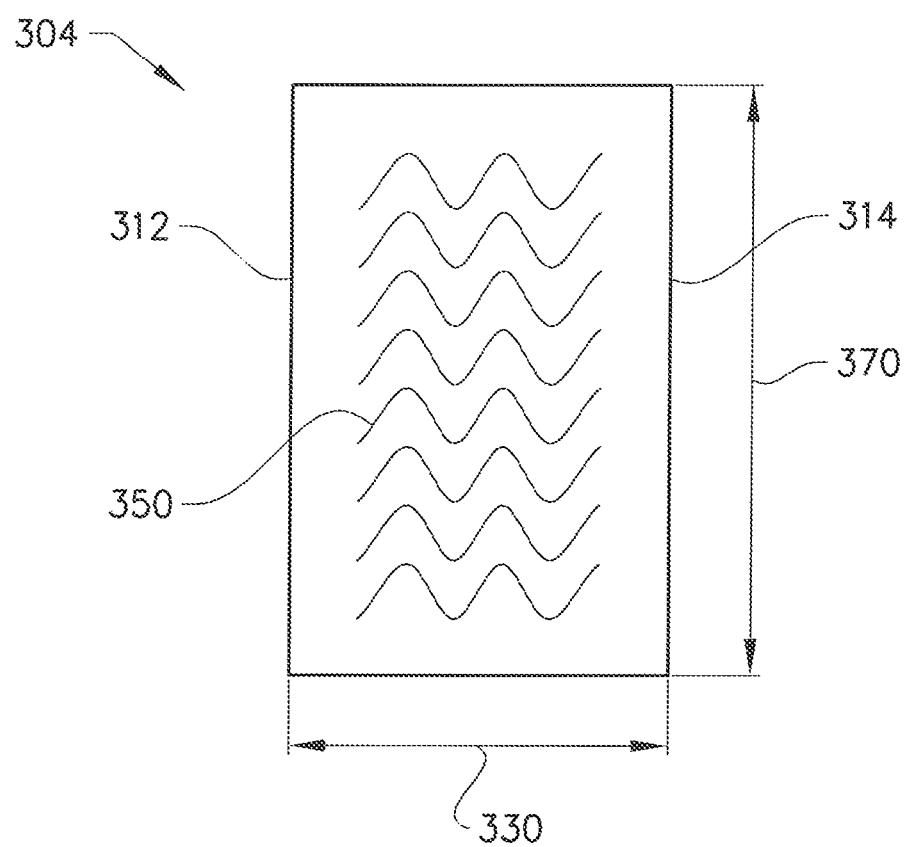
FIG. 8 depicts a top view of an example embodiment of a second part of a powder distributor.

FIG. 8 depicts a top view of still another example embodiment of a second part of a powder distributor. In the embodiment the slits 350 are meander shaped. A meander shaped slit may improve the flexibility more than a straight slit provided on a second part with the same dimensions. The reason is that the total length of the meander shaped slit is much longer than a straight slit, resulting in a softer second part since more material is removed.

It should be understood that the present invention is not limited to the above-described embodiments and many modifications are possible within the scope of the following claims. Such modifications may, for example, involve using a different source of energy beam than the exemplified electron beam such as a laser beam. Additionally or otherwise, materials other than metallic powder may be used, such as the non-limiting examples of powder of polymers or powder of ceramics.

That which is claimed:

1. An apparatus for forming at least one three-dimensional article through successive fusion of parts of a powder bed, which parts corresponds to successive cross sections of the three-dimensional article, said apparatus comprising:
    a powder distributor configured for evenly distributing a layer of powder on top of a work table; and
    an energy beam configured for fusing the powder layer in selected locations corresponding to said cross section of the three-dimensional article,
    wherein:
        said powder distributor comprises at least a first part and a second part, said first part being an elongated rod having a foremost edge and an opposing trailing edge, said first part being movably provided at a predetermined distance above the powder bed and with its central axis in parallel with a top surface of said work table, said second part being a foil having at least a first and a second opposite edge portions;
        said foil is provided between said elongated rod and said work table and intermediate said foremost and trailing edges of said elongated rod;
        said first and second opposite edge portions of the foil are attached to said elongated rod so that a distance between said first and second edge portions is smaller than the distance between said first and second edge portions of said foil when said foil is in a flat position;
        said elongated rod comprises a protrusion disposed on said foremost edge and extending in a direction towards the work table, so as to create a volume under said elongated rod for decreasing a force from the powder acting on the elongated rod in a direction perpendicular to said work table while said layer of powder is evenly distributed over said work table.

2. The apparatus according to claim 1, wherein said foil has a plurality of slits.

3. The apparatus according to claim 2, wherein said slits are pointing in a direction perpendicular to said first and second opposite edge portions.

4. The apparatus according to claim 2, wherein said slits are positioned an angle α with a normal to said first edge portions.

5. The apparatus according to claim 4, wherein said angle α is within a range of 25 degrees to 65 degrees.

6. The apparatus according to claim 2, wherein said slits are at least one of curved or meander-shaped.

7. The apparatus according to claim 1, wherein the powder provided on the work table is made of at least one of metal, plastic, ceramic, or composite material.

8. The apparatus according to claim 1, wherein the first and second opposite edge portions of the foil are attached to a surface of said elongated rod that is at least one of flat, convex, or concave-shaped.

9. The apparatus according to claim 8, wherein the distance between said first and second opposite edge portions of said foil when attached to said elongated rod is smaller than a width of said flat, convex, or concave-shaped surface.

10. The apparatus according to claim 1, wherein the first and second opposite edge portions of said foil are attached relative to a surface of the elongated rod via a first screw and a second screw, respectively.

11. The apparatus according to claim 10, wherein said first and second opposite edge portions of said foil are provided in a first slit and a second slit, respectively, wherein said first slit and said second slit are provided on the elongated rod, and wherein said first screw and said second screw extend into said first slit and said second slit, respectively.

12. The apparatus according to claim 10, wherein said foil is removably attached to said elongated rod via said first and second screws.

13. The apparatus according to claim 1, wherein the thickness of the foil is smaller than 1 mm.

14. The apparatus according to claim 1, wherein said foil is made of at least one of metal, plastic, carbon fibre, or Kevlar.

15. The apparatus according to claim 1, wherein the foil is made of the same material as the powder material which is to be fused.

16. The apparatus according to claim 1, further comprising at least one vibrator attached to said elongated rod.

17. The apparatus according to claim 1, wherein said rod comprises a first and second element attached together via said foil and a support member.

18. The apparatus according to claim 17, wherein at least one vibrator is attached between said first and second elements.

19. The apparatus according to claim 1, wherein at least a portion of said first and second parts are separated from each other by a predetermined distance.

* * * * *